US011313161B2

(12) United States Patent
Krstic

(10) Patent No.: US 11,313,161 B2
(45) Date of Patent: Apr. 26, 2022

(54) VEHICLE DOOR CLIP ASSEMBLY AND METHOD FOR PAINTING A VEHICLE USING THE SAME

(71) Applicant: Volvo Car Corporation, Gothenburg (SE)

(72) Inventor: Daniel Krstic, Gothenburg (SE)

(73) Assignee: Volvo Car Corporation, Gothenburg (SE)

( * ) Notice: Subject to any disclaimer, the term of this patent is extended or adjusted under 35 U.S.C. 154(b) by 514 days.

(21) Appl. No.: 16/263,237

(22) Filed: Jan. 31, 2019

(65) Prior Publication Data

US 2020/0248491 A1 Aug. 6, 2020

(51) Int. Cl.
*E05C 21/00* (2006.01)
*E05B 17/00* (2006.01)
(Continued)

(52) U.S. Cl.
CPC ........ *E05C 21/005* (2013.01); *E05B 17/0012* (2013.01); *E05C 17/047* (2013.01); *E05C 19/18* (2013.01); *E05Y 2900/531* (2013.01)

(58) Field of Classification Search
CPC . Y10T 292/088; E05C 21/005; E05C 17/047; E05C 19/18; E05C 17/00; E05C 17/02; E05C 17/04; E05C 17/12; E05C 17/16; E05C 17/20; E05C 17/206; E05C 17/22; E05C 17/30; E05C 19/06; E05C 19/063; E05C 19/066; E05C 17/44; E05C 17/443; E05C 17/446; E05C 17/54; E05C 17/64; E05C 17/46; E05C 17/52; E05C 19/00; E05C 21/00; E05C 13/00; E05C 13/02; E05B 17/0012; E05B 15/0006; E05B 15/1635; E05B 17/005; E05B 63/0043; E05B 63/0052; E05B 63/0056;
(Continued)

(56) References Cited

U.S. PATENT DOCUMENTS 7,766,401 B2 * 8/2010 Costigan ................ E05B 79/12
292/336.3
8,117,717 B2 2/2012 Perche
(Continued)

FOREIGN PATENT DOCUMENTS

DE 3835810 A * 4/1990 ......... B05B 13/0292
DE 10261861 A1 * 8/2004 ............. E05C 19/02
(Continued)

*Primary Examiner* — Kristina R Fulton
*Assistant Examiner* — Steven A Tullia
(74) *Attorney, Agent, or Firm* — Clements Bernard Walker; Christopher L. Bernard

(57) ABSTRACT

A door clip assembly that utilizes both reusable and disposable components, thereby minimizing material waste and providing significant cost savings. The bulk of the door clip assembly is manufactured from a reusable metal or plastic material that is resistant to both heat and chemicals so that it can be periodically paint stripped and/or cleaned and reused. Only the tip of the door clip assembly is manufactured from a disposable plastic or rubber material that is inexpensive so that it can be discarded, and that can safely contact an exposed surface and/or finish of a vehicle without damaging it. The door clip assembly is easy to install/remove and does not require a driver tool.

20 Claims, 10 Drawing Sheets

(51) Int. Cl.
*E05C 19/18* (2006.01)
*E05C 17/04* (2006.01)

(58) Field of Classification Search
CPC .......... E05B 5/082; E05B 13/02; E05B 15/00; E05Y 2900/531; B62D 25/12; B62D 24/00; B62D 24/02; B62D 24/04; B62D 33/077; G06F 1/187; F16M 11/041
See application file for complete search history.

(56) References Cited

U.S. PATENT DOCUMENTS

| | | | | |
|---|---|---|---|---|
| 2009/0021025 | A1* | 1/2009 | Corre | E05B 17/0012 292/259 A |
| 2009/0267355 | A1 | 10/2009 | Perche | |
| 2013/0264832 | A1* | 10/2013 | Boulay | E05B 83/36 292/289 |
| 2016/0069111 | A1* | 3/2016 | Leon | B05B 13/0292 269/47 |

FOREIGN PATENT DOCUMENTS

| | | | | | |
|---|---|---|---|---|---|
| DE | 10341145 | A1 * | 4/2005 | B62D 65/06 |
| DE | 102013004727 | A1 * | 3/2014 | E05C 21/005 |
| DE | 102012023768 | A1 * | 6/2014 | B05B 13/0292 |
| EP | 0931895 | A1 * | 7/1999 | E05C 21/005 |
| EP | 1781878 | B1 * | 9/2009 | E05C 19/188 |
| EP | 2180119 | A1 * | 4/2010 | E05C 21/005 |
| EP | 2182146 | A1 * | 5/2010 | E05C 21/005 |
| FR | 2833562 | A1 | 6/2003 | |
| FR | 2889227 | A1 | 2/2007 | |
| FR | 2918098 | A1 * | 1/2009 | E05C 21/005 |
| FR | 2920804 | A1 * | 3/2009 | E05B 17/0012 |
| FR | 2926102 | A1 * | 7/2009 | E05B 17/0012 |
| FR | 3006704 | A1 * | 12/2014 | E05C 21/005 |
| FR | 3058122 | A1 * | 5/2018 | B62D 65/026 |
| FR | 3062631 | A1 * | 8/2018 | E05C 21/005 |
| GB | 2539636 | A * | 12/2016 | E21B 33/037 |
| WO | WO-2019016441 | A1 * | 1/2019 | E05C 21/005 |

* cited by examiner

VEHICLE DOOR CLIP ASSEMBLY AND METHOD FOR PAINTING A VEHICLE USING THE SAME

TECHNICAL FIELD

The present invention relates generally to the automotive field. More specifically, the present invention relates to a vehicle door clip assembly and method for painting a vehicle using the same. The vehicle door clip assembly utilizes both reusable and disposable components, minimizing material waste and providing significant cost savings.

BACKGROUND ART

A conventional vehicle door, hood, or trunk gate is held closed/released using a latch assembly that is typically installed in a moving component of a vehicle and a striker member that is typically installed on a stationary component of the vehicle. For example, FIG. 1 illustrates a latch assembly 10 that is installed in the door, hood, or trunk gate 12 of a vehicle and accessible through a slot 14 manufactured in the door, hood, or trunk gate 12 and a striker member 16 that is installed on the door frame 18 of the vehicle. The latch assembly 10 receives and retains the striker member 16 when the door, hood, or trunk gate 12 is closed, and releases the striker member 16 when actuated by the associated manual handle or electronic release assembly as controlled by a user.

When a vehicle is initially painted, the hardware, including the latch assembly 10 and striker member 16, is not yet installed. However, during initial painting, it is desirable that the door, hood, or trunk gate 12 is held partially or fully closed, such that an even and consistent coating can be applied to all exterior surfaces of the vehicle. This is complicated by the fact that the vehicle is moved around during this process, which could cause the door, hood, or trunk gate 12 to undesirably open and/or slam shut. This same need to hold the door, hood, or trunk gate 12 partially or fully closed is present during other manufacturing and assembly processes as well, presenting similar challenges. A door, hood, or trunk gate 12 must sometimes be held shut before the appropriate hardware is installed.

Conventionally, a door clip assembly 20, such as that illustrated in FIG. 2, is used to hold the door, hood, or trunk gate 12 (FIG. 1) closed during painting or the like. In general, this door clip assembly 20 includes a base member 22 that is selectively coupled to the door frame 18 (FIG. 1) of the vehicle, where the striker member 16 (FIG. 1) is later coupled. The base member 22 is coupled to the door frame 18 via a fixed post member 24 that protrudes from the bottom of the base member 22 and engages an existing striker member hole manufactured into the door frame 18. The base member 22 is also coupled to the door frame 18 via a removable (e.g., threaded) post member 26 that protrudes through and from the bottom of the base member 22 and engages another existing striker member hole manufactured into the door frame 18. Disadvantageously, this removable post member 26 is typically assembled/removed manually using a driver tool, adding complexity and cost to the painting or other manufacturing or assembly process.

A stop member 28 is coupled to the top of the base member 22 of the door clip assembly 20 and serves to contact the outside edge of the slot 14 (FIG. 1) when the door, hood, or trunk gate 12 is closed, thereby limiting the degree of closure of the door, hood, or trunk gate 12. For the door clip assembly 20 illustrated, the stop member 28 consists of a folded planar structure that is coupled to a foundation member 30 that is coupled to the top of the base member 22. A deflectable retention member 32 is coupled to the top of the foundation member 30. This deflectable retention member 32 includes a ramp structure 34 that initially contacts the inside edge of the slot 14 as the door, hood, or trunk gate 12 is closed, causing the deflectable retention member 32 to deflect into the vehicle until the inside edge of the slot 14 passes a tongue portion 36 of the deflectable retention member 32. At this point, the tongue portion 36 of the deflectable retention member 32 contacts the back of the inside edge of the slot 14, holding the door, hood, or trunk gate 12 securely closed during the painting or other manufacturing or assembly process. Optionally, the deflectable retention member 32 also includes a deflection limiting structure 38 disposed opposite the ramp structure 34 for limiting the deflection of the deflectable retention member 32 into the vehicle, keeping the door clip assembly 20 from breaking when it flexes. Disadvantageously, the deflectable retention member 32 is prone to breaking when the door, hood, or trunk gate 12 is eventually opened, potentially causing painting or other manufacturing or assembly errors and adding cost to the painting or other manufacturing or assembly process.

FIG. 3 illustrates a conventional door clip assembly 20 coupled to the door frame 18 of a vehicle, where the striker member 16 (FIG. 1) is later coupled, as well as the stop member 28 of the door clip assembly 20 contacting the outside edge of the slot 14 when the door, hood, or trunk gate 12 is closed, thereby limiting the degree of closure of the door, hood, or trunk gate 12. The tongue portion 36 of the deflectable retention member 32 is illustrated contacting the back of the inside edge of the slot 14, holding the door, hood, or trunk gate 12 securely closed during the painting or other manufacturing or assembly process.

One significant problem is that, even when a conventional door clip assembly 20 does not break, layers of paint and the like can build up on the door clip assembly 20, which is typically made entirely of a disposable plastic material. Thus, such door clip assemblies 20 are typically simply discarded after use (after time-consuming manual removal using a driver tool), resulting in substantial material waste at significant cost. Thus, what is still needed in the art is an alternative to the door clip assembly 20 that utilizes both reusable and disposable components, thereby minimizing material waste and providing significant cost savings.

SUMMARY

The present disclosure provides a door clip assembly that utilizes both reusable and disposable components, thereby minimizing material waste and providing significant cost savings. The bulk of the door clip assembly is manufactured from a reusable metal or plastic material that is resistant to both heat and chemicals so that it can be periodically paint stripped and/or cleaned and reused. Only the tip of the door clip assembly is manufactured from a disposable plastic or rubber material that is inexpensive so that it can be discarded, and that can safely contact an exposed surface and/or finish of a vehicle without damaging it. The door clip assembly is easy to install/remove and does not require a driver tool.

In one exemplary embodiment, the vehicle door clip assembly operable for holding a door, hood, or trunk gate of a vehicle closed, the door clip assembly includes: a reusable body portion manufactured from a first material, the body portion adapted to be removably coupled to a body structure of the vehicle; and a disposable tip portion manufactured from a second material, the tip portion adapted to be removably coupled to the body portion and contact the door, hood, or trunk gate of the vehicle. The first material is one or more of a metal material and a plastic material that is capable of withstanding a vehicle coating stripping process without damage. The second material is one or more of a plastic material and a rubber material that is capable of contacting a vehicle coating without marking or damaging the vehicle coating. The tip portion includes a keyed attachment portion that is adapted to be removably coupled to a keyed receptacle portion of the body portion. The keyed receptacle portion of the body portion is coupled to a remainder of the body portion via an intervening biasing spring member that allows the tip portion and keyed receptacle portion of the body portion to translate with respect to the remainder of the body portion. The tip portion is adapted to be compressed towards the body portion through the intervening biasing spring member when the tip portion is contacted by the door, hood, or trunk gate of the vehicle. The body portion includes one or more expandable post structures adapted to be removably inserted into one or more holes disposed in the body structure of the vehicle to removably couple the body portion to the body structure of the vehicle. The body portion also includes a lower base member, and wherein the one or more expandable post members protrude from a bottom of the lower base member. The body portion further includes an upper base member positioned adjacent to the lower base member, wherein one or more post members protrude from a bottom of the upper base member, through the lower base member, and into the one or more expandable post structures, and wherein the one or more expandable post structures are expanded/contracted via insertion/withdrawal of the one or more post members into/from the one or more expandable post structures with translation of the upper base member towards/away from the lower base member. The body portion further includes one or more retention members protruding from a top of the lower base member and adapted to limit translation of the upper base member with respect to the lower base member.

In another exemplary embodiment, the method for painting a vehicle, includes: attaching a vehicle door clip assembly to a body structure of the vehicle, the door clip assembly including a reusable body portion manufactured from a first material and a disposable tip portion manufactured from a second material; closing a door, hood, or trunk gate of the vehicle to contact the disposable tip portion and engage the reusable body portion of the door clip assembly attached to the body structure of the vehicle; delivering a coating to a surface of the vehicle including a surface of the door, hood, or trunk gate of the vehicle and the door clip assembly; opening the door, hood, or trunk gate of the vehicle and removing the door clip assembly from the body structure of the vehicle; and removing the disposable tip portion from the door clip assembly and coupling a new disposable tip portion to the reusable body portion. The first material is one or more of a metal material and a plastic material that is capable of withstanding a coating stripping process without damage. The second material is one or more of a plastic material and a rubber material that is capable of contacting the coating without marking or damaging the coating. The method also includes stripping the coating from the reusable body portion after the disposable tip portion has been removed and prior to coupling the new disposable tip portion to the reusable body portion. The method further includes disposing of the disposable tip portion after the disposable tip portion has been removed from the door clip assembly. Attaching the door clip assembly to the body structure of the vehicle includes inserting one or more expandable post structures protruding from a bottom of a base member of the reusable body portion of the door clip assembly into one or more holes disposed in the body structure of the vehicle.

BRIEF DESCRIPTION OF THE DRAWINGS

The present invention is illustrated and described herein with reference to the various drawings, in which like reference numbers are used to denote like assembly components/method steps, as appropriate, and in which.

DESCRIPTION OF EMBODIMENTS

Again, the present disclosure provides a door clip assembly that utilizes both reusable and disposable components, thereby minimizing material waste and providing significant cost savings. The bulk of the door clip assembly is manufactured from a reusable metal or plastic material that is resistant to both heat and chemicals so that it can be periodically paint stripped and/or cleaned and reused. Only the tip of the door clip assembly is manufactured from a disposable plastic or rubber material that is inexpensive so that it can be discarded, and that can safely contact an exposed surface and/or finish of a vehicle without damaging it. The door clip assembly is easy to install/remove and does not require a driver tool.

Preferably, the door clip assembly of the present disclosure keeps the doors, hood, or trunk gate of a vehicle closed during a painting, manufacturing, or assembly process, with an opening force of 50 N or more, appropriate in most such applications. The door clip assembly does not drop or trap any particles that could ruin a coating finish, for example. The door clip assembly operates silently, and is forgiving enough to accommodate a variety of different vehicles and configurations. Preferably, the majority of the components of the door clip assembly are manufactured from a reusable, temperature (e.g., 200 degree C.) tolerant metal or plastic material from which a coating can periodically be removed, with the exception of the replaceable tip, which is manufactured from a disposable plastic or rubber material that will not mark a coating finish, for example. Thus, the present disclosure provides a door clip assembly that utilizes both reusable and disposable components, thereby minimizing material waste and providing significant cost savings.

Figure 1:
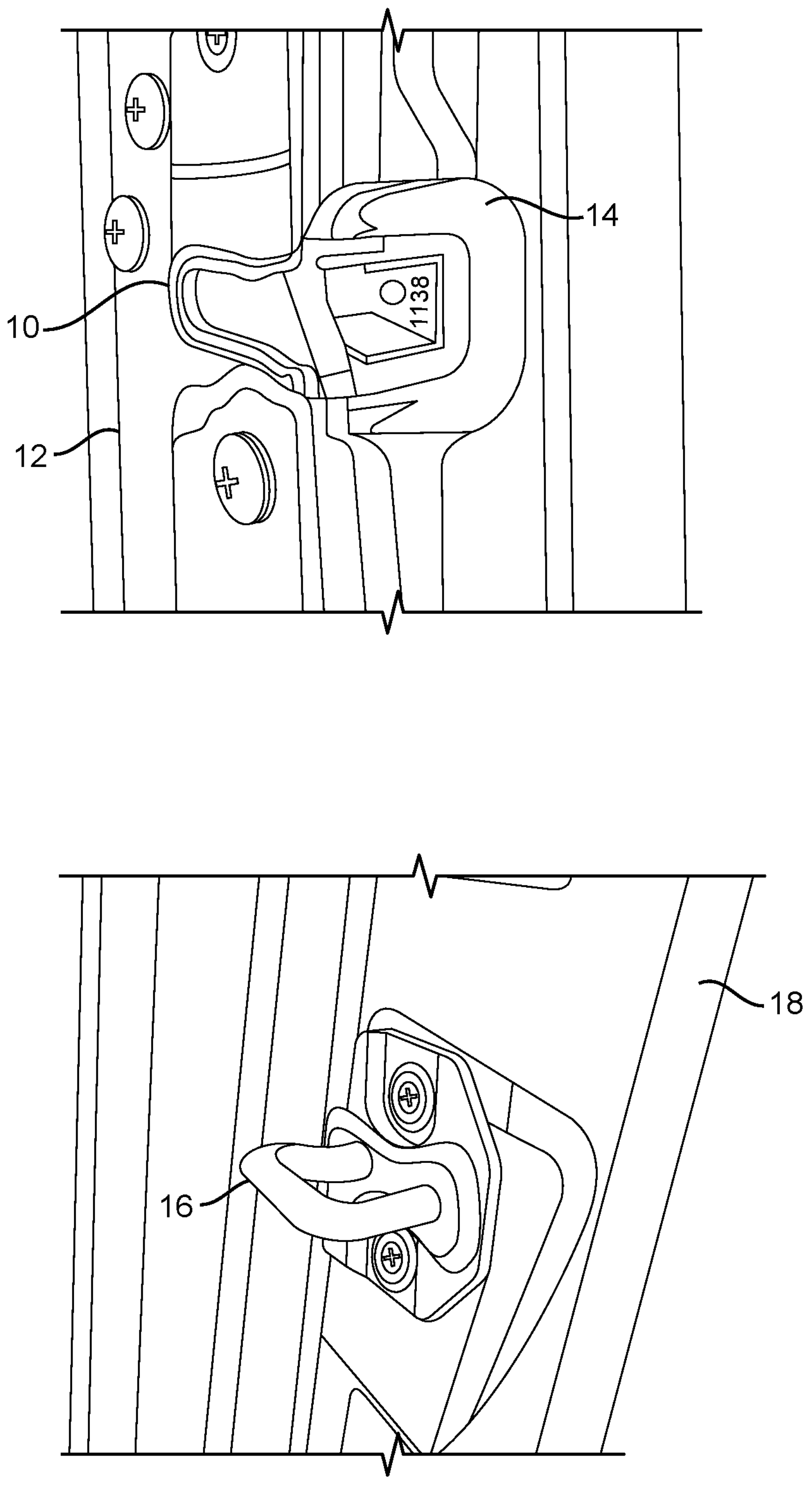
FIG. 1 is a pair of perspective views of a conventional vehicle door, hood, or trunk gate latch assembly/striker member.
Figure 2:
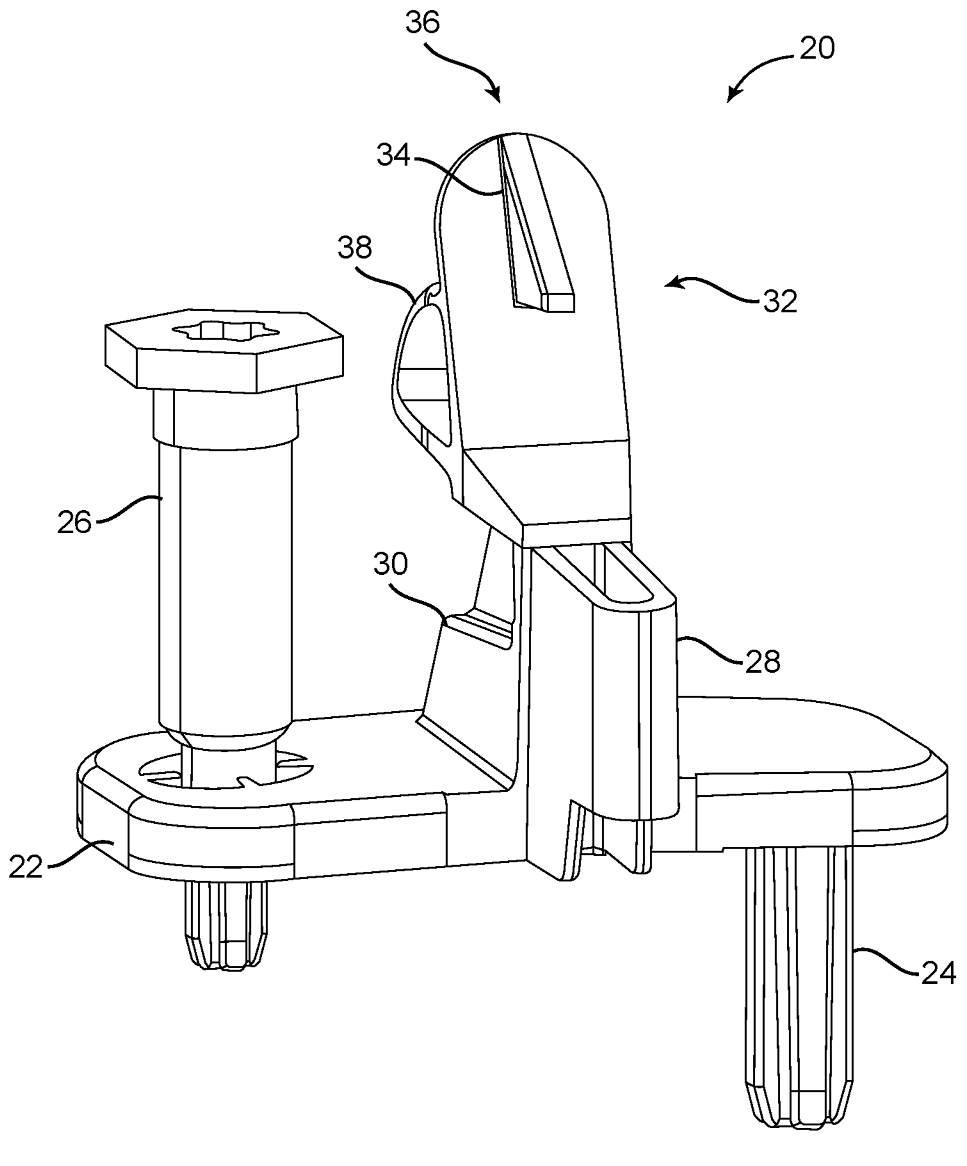
FIG. 2 (Prior Art)
FIG. 2 is a perspective view of a conventional vehicle door clip assembly.
Figure 3:
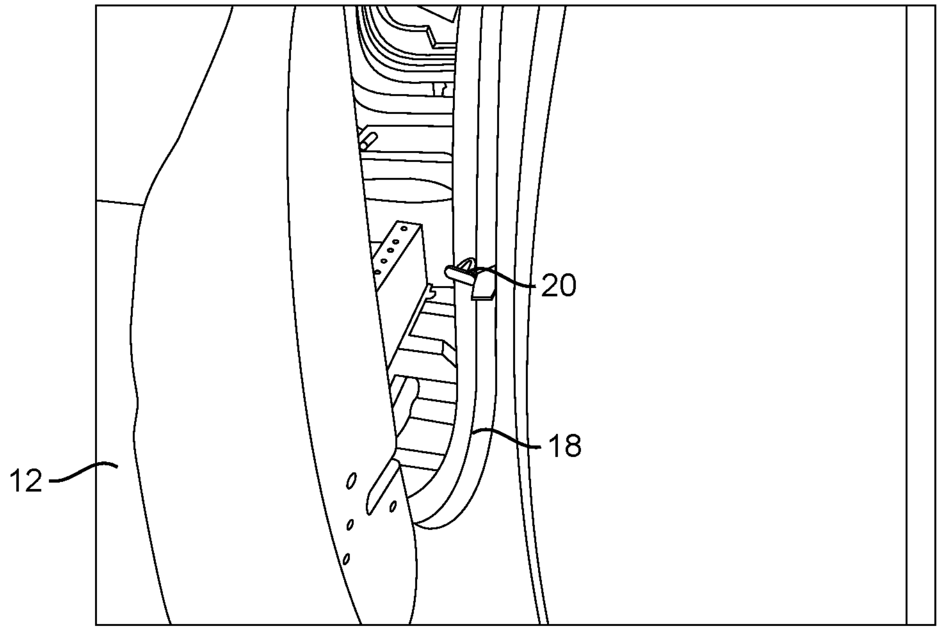
FIG. 3 is a pair of perspective views of the conventional vehicle door clip assembly of FIG. 2 in use with a conventional vehicle door, hood, or trunk gate during a painting process.
Figure 3:
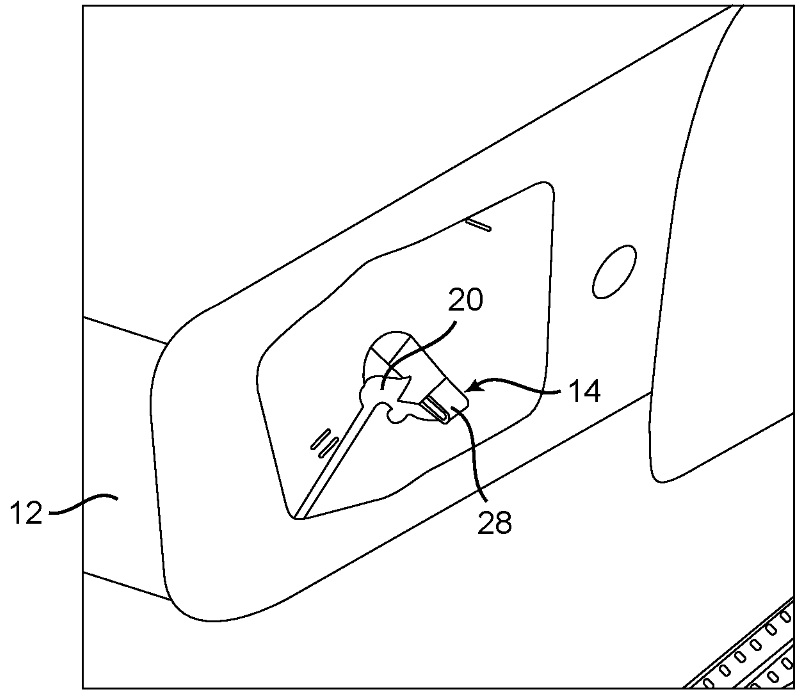
Figure 4:
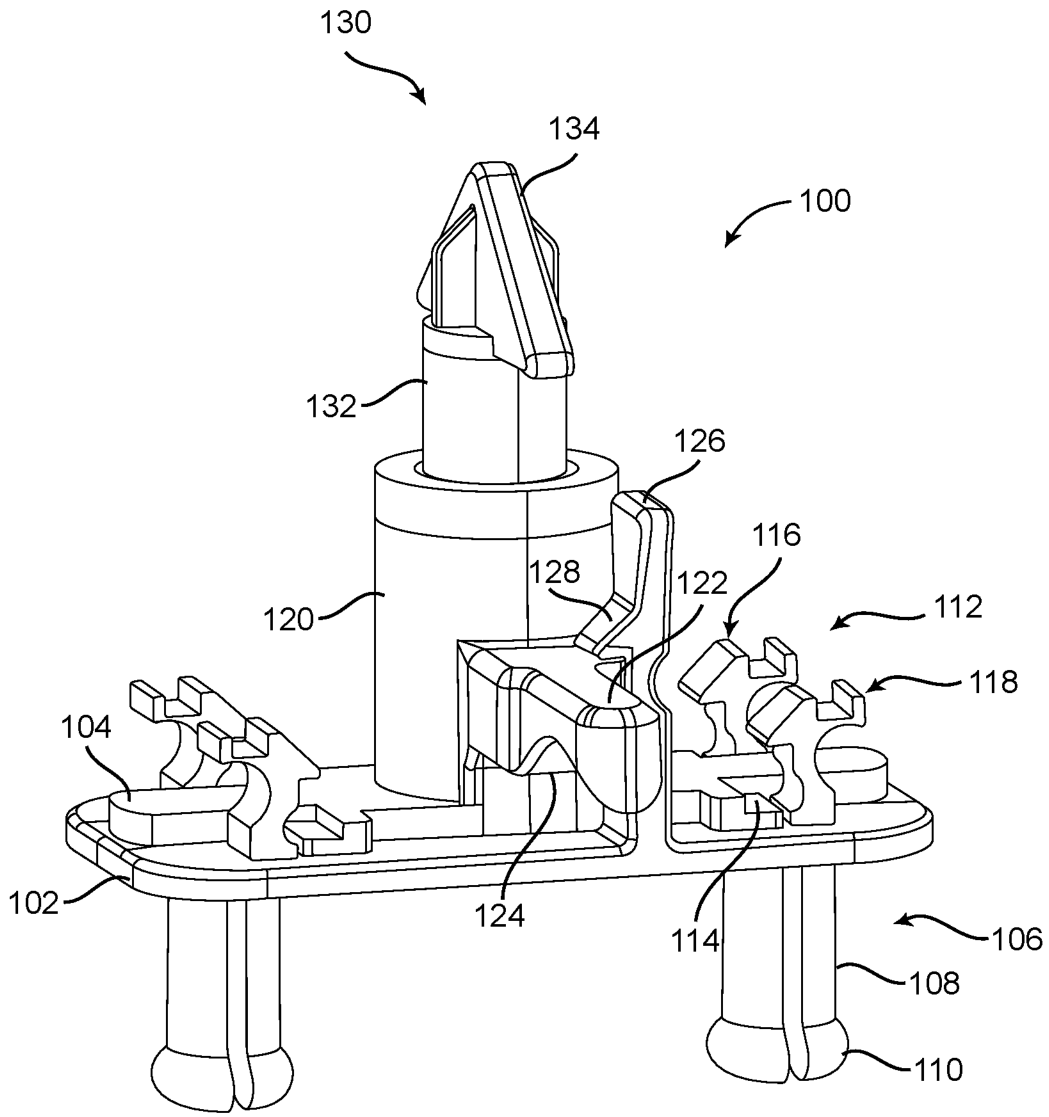
FIG. 4 is a perspective view of one exemplary embodiment of the vehicle door clip assembly of the present disclosure.

Referring now specifically to FIG. 4, in one exemplary embodiment, the present disclosure provides a door clip assembly 100 that is used to hold the door, hood, or trunk gate 12 (FIGS. 1 and 3) of a vehicle partially or fully closed during a vehicle painting, manufacturing, or assembly process. This door clip assembly 100 includes a lower base member 102 that is movably coupled to an upper base member 104. The lower base member 102 is selectively coupled to the door frame 18 (FIGS. 1 and 3) of the vehicle, where the striker member 16 (FIG. 1) is later coupled. The lower base member 102 is coupled to the door frame 18 using a pair of expandable post members 106 that protrude from the bottom of the lower base member 102 and selectively engage the existing striker member holes manufactured into the door frame 18. Each of the expandable post members 106 includes a plurality of deflectable petal structures 108 that each terminate in a widened retention portion 110. These deflectable petal structures 108 and widened retention portions 110 serve to secure the lower base member 102 in and/or release the lower base member 102 from the existing striker member holes manufactured into the door frame 18. This functionality is described in greater detail herein below and, advantageously, requires no driver tool. The upper base member 104 is allowed to translate towards and away from the lower base member 102 within the confines of a plurality of upright members 112 coupled to the top of the lower base member 102, opposite the expandable post members 106. Each of the upright members 112 sits within a step or slot 114 manufactured into a side of the upper base member 104, thereby holding the upper base member 104 and the lower base member 102 in rigid lateral, transverse, and rotational alignment, including during translation. The top portion of each of the upright members 112 includes a hook structure 116 that limits the relative translation of the upper base member 104 and the lower base member 102. Each of the upright members 112, however, is compliant enough that the it may be manually deflected using an associated tab structure 118 to such a degree that the upper base member 104 can be completely removed from the lower base member 102, if the upright members 112 are manually deflected in pairs or all together, for example.

A cylindrical bore structure 120 extends from the top of the upper base member 104. A stop member 122 extends concentrically/laterally from the wall of the cylindrical bore structure 120 and serves to contact the outside edge of the slot 14 (FIGS. 1 and 3) when the door, hood, or trunk gate 12 is closed, thereby limiting the degree of closure of the door, hood, or trunk gate 12. The stop member 122 includes a finger recess 124 on a bottom surface thereof, the finger recess 124 providing a grip by which a user can grasp the stop member 122 and the upper base member 104 and translate it with respect to or remove it from the lower base member 102 and upright members 112. An elongate release lever 126 including a retention hook structure 128 extends from the lower base member 102 adjacent to the upper base member 104 (which is preferably a bit smaller than the lower base member 102). The retention hook structure 128 of the elongate release lever 126 is disposed over the top of the stop member 122 when the upper base member 104 is fully translated into the upright members 112 and sits flush against the lower base member 102. The elongate release lever 126 and retention hook structure 128 are deflected slightly to the side to release the stop member 122, again to translate the upper base member 104 with respect to or remove it from the lower base member 102 and upright members 112.

An extensible retention member 130 including a cylindrical lower base member 132 and a plurality of opposed upper ramp structures 134 is coupled to the cylindrical bore structure 120, with the cylindrical lower base member 132 disposed partially within the cylindrical bore structure 120. This portion of the door clip assembly 100 is described in greater detail herein below, as part of it forms the disposable tip of the door clip assembly 100. In operation, one of the upper ramp structures 134 initially contacts the inside edge of the slot 14 as the door, hood, or trunk gate 12 is closed, causing the cylindrical lower base member 132 of the extensible retention member 130 to retract into the cylindrical bore structure 120 until the inside edge of the slot 14 passes the upper ramp structure 134 of the extensible retention member 130. At this point, the cylindrical lower base member 132 of the extensible retention member 130 extends from the cylindrical bore structure 120 and the opposite one of the upper ramp structures 134 contacts the back of the inside edge of the slot 14, holding the door, hood, or trunk gate 12 securely closed during the painting or other manufacturing or assembly process. The extensible retention member 130 retracts and extends in a similar manner when the door, hood, or trunk gate 12 is opened. Thus, the extensible retention member 130 forms a pressure latch for holding the door, hood, or trunk gate 12 closed, unless an adequate opening force is applied (for example, 50 N or more). This inherent movement of the various components also allows a degree of flexibility in the "fit" of the door clip assembly 100 when used with different makes and models of vehicles, as well as different vehicles of the same make and model.

Figure 5:
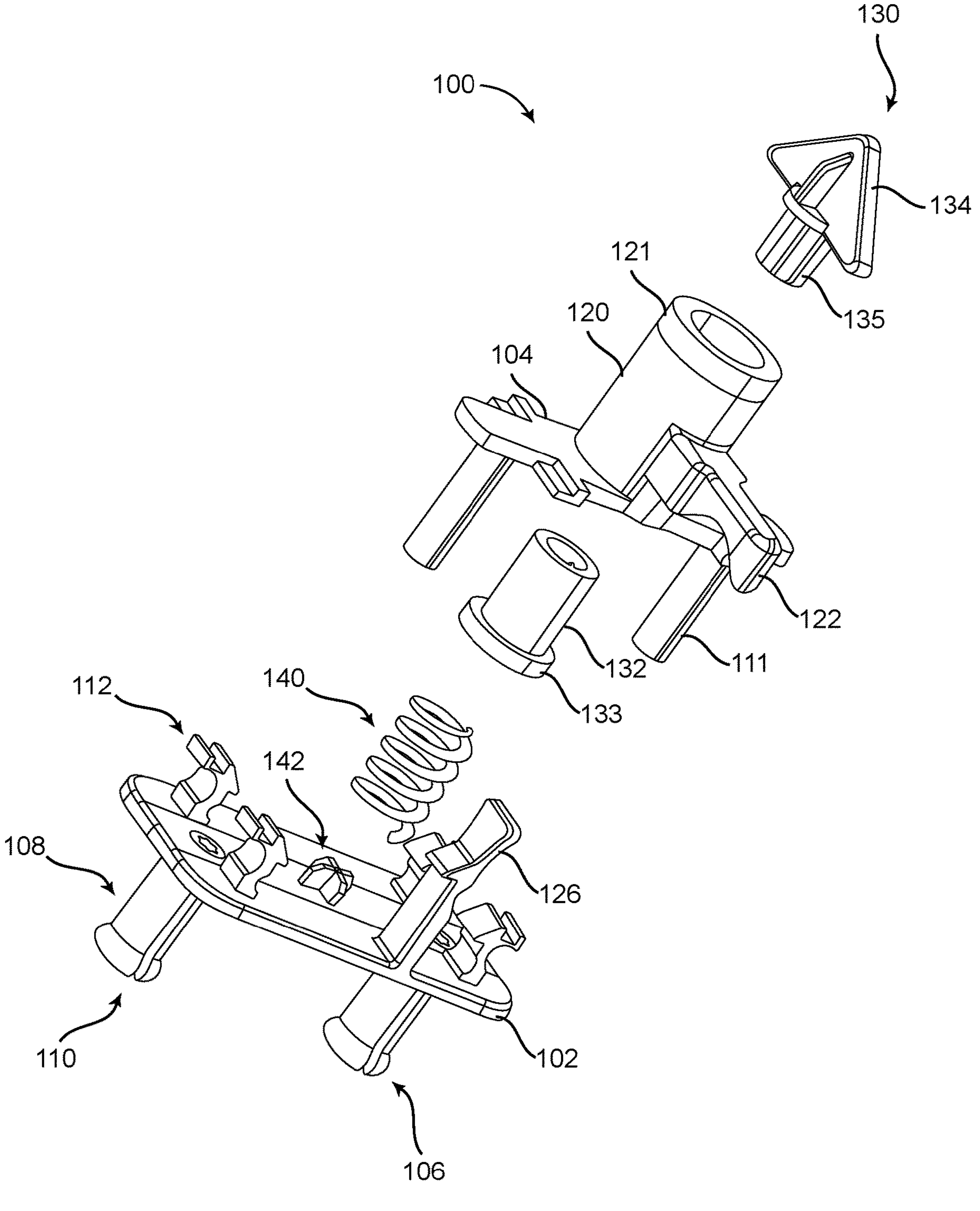
FIG. 5 is an exploded perspective view of the vehicle door clip assembly of FIG. 4.

Referring now specifically to FIG. 5, the lower base member 102 is again selectively coupled to the door frame 18 (FIGS. 1 and 3) via a pair of expandable post members 106 that protrude from the bottom of the lower base member 102 and selectively engage the existing striker member holes manufactured into the door frame 18. Each of the expandable post members 106 includes a plurality of deflectable petal structures 108 that each terminate in a widened retention portion 110. These deflectable petal structures 108 and widened retention portions 110 serve to secure the lower base member 102 in and/or release the lower base member 102 from the existing striker member holes manufactured into the door frame 18. The deflectable petal structures 108 and widened retention portions 110 define tapering internal voids and are biased apart into a securing configuration by a pair of cylindrical post structures 111 that protrude from the bottom of the upper base member 104 and into the tapering internal voids as the upper base member 104 is translated towards the lower base member 102. The deflectable petal structures 108 and widened retention portions 110 relax together into a releasing configuration when the pair of cylindrical post structures 111 that protrude from the bottom of the upper base member 104 and into the tapering internal voids are withdrawn from the tapering internal voids as the upper base member 104 is translated away from the lower base member 102. Again, the upper base member 104 is allowed to translate towards and away from the lower base member 102 within the confines of the plurality of upright members 112 coupled to the top of the lower base member 102.

The cylindrical bore structure 120 extends from the top of the upper base member 104, and the stop member 122 extends concentrically/laterally from the wall of the cylindrical bore structure 120 and serves to contact the outside edge of the slot 14 (FIGS. 1 and 3) when the door, hood, or trunk gate 12 is closed, thereby limiting the degree of closure of the door, hood, or trunk gate 12. The elongate release lever 126 extends from the lower base member 102 adjacent to the upper base member 104 (which is preferably a bit smaller than the lower base member 102). The elongate release lever 126 is deflected slightly to the side to release the stop member 122, again to translate the upper base member 104 with respect to or remove it from the lower base member 102 and upright members 112.

Again, the extensible retention member 130 including the cylindrical lower base member 132 and the plurality of opposed upper ramp structures 134 is coupled to the cylindrical bore structure 120, with the cylindrical lower base member 132 disposed partially within the cylindrical bore structure 120. As is seen in this exploded view, the cylindrical lower base member 132 is disposed within the bore structure 120 from the bottom of the bore structure 120. A lower lip structure 133 associated with the cylindrical lower base member 132 interacts with an upper lip structure 121 associated with the bore structure 120 to prevent the cylindrical lower base member 132 from passing through and out of the top of the bore structure 120 as the cylindrical lower base member 132 translates concentrically within the bore structure 120. The upper ramp structures 134 are removably coupled to the cylindrical lower base member 132 through the top of the bore structure 120 via a keyed attachment portion 135. This forms the removable tip of the door clip assembly 100. Again, in operation, one of the upper ramp structures 134 initially contacts the inside edge of the slot 14 as the door, hood, or trunk gate 12 is closed, causing the cylindrical lower base member 132 of the extensible retention member 130 to retract into the cylindrical bore structure 120 until the inside edge of the slot 14 passes the upper ramp structure 134 of the extensible retention member 130. At this point, the cylindrical lower base member 132 of the extensible retention member 130 extends from the cylindrical bore structure 120 and the opposite one of the upper ramp structures 134 contacts the back of the inside edge of the slot 14, holding the door, hood, or trunk gate 12 securely closed during the painting or other manufacturing or assembly process. The extensible retention member 130 retracts and extends in a similar manner when the door hood, or trunk gate 12 is opened. Thus, the extensible retention member 130 forms a pressure latch for holding the door, hood, or trunk gate closed, unless an adequate opening force is applied (for example, 50 N or more). This inherent movement of the various components also allows a degree of flexibility in the "fit" of the door clip assembly 100 when used with different makes and models of vehicles, as well as different vehicles of the same make and model.

The retraction and extension of the extensible retention member 130 is dampened by a biasing spring 140 disposed between the cylindrical lower base member 132 and the lower base member 102 within the bore structure 120. The biasing spring 140 is seated on a seating structure 142 disposed on the top surface of the lower base member 102.

Figure 6:
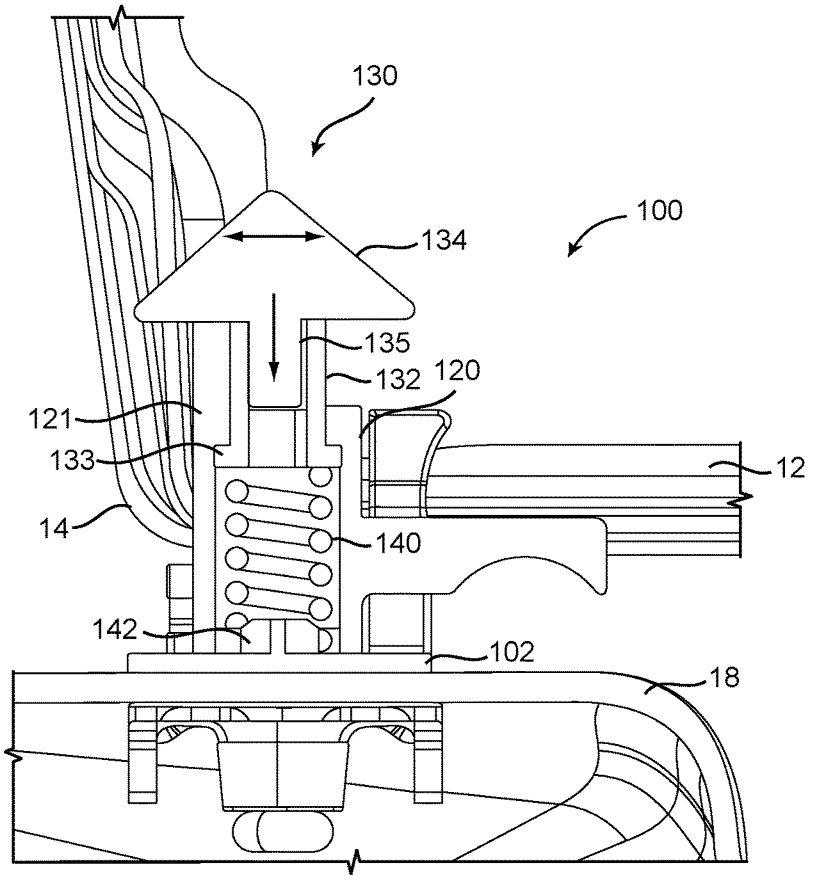
FIG. 6 is a cross-sectional top view of the vehicle door clip assembly of FIGS. 4 and 5 in use with a conventional vehicle door, hood, or trunk gate during a painting or other manufacturing or assembly process.

Referring now specifically to FIG. 6, the extensible retention member 130 including the cylindrical lower base member 132 and the plurality of opposed upper ramp structures 134 is coupled to the cylindrical bore structure 120, with the cylindrical lower base member 132 disposed partially within the cylindrical bore structure 120. As is seen in this cross-sectional top view, the cylindrical lower base member 132 is disposed within the bore structure 120 from the bottom of the bore structure 120. The lower lip structure 133 associated with the cylindrical lower base member 132 interacts with the upper lip structure 121 associated with the bore structure 120 to prevent the cylindrical lower base member 132 from passing through and out of the top of the bore structure 120 as the cylindrical lower base member 132 translates concentrically within the bore structure 120. The upper ramp structures 134 are removably coupled to the cylindrical lower base member 132 through the top of the bore structure 120 via the keyed attachment portion 135. Again, in operation, one of the upper ramp structures 134 initially contacts the inside edge of the slot 14 as the door, hood, or trunk gate 12 is closed, causing the cylindrical lower base member 132 of the extensible retention member 130 to retract into the cylindrical bore structure 120 until the inside edge of the slot 14 passes the upper ramp structure 134 of the extensible retention member 130. At this point, the cylindrical lower base member 132 of the extensible retention member 130 extends from the cylindrical bore structure 120 and the opposite one of the upper ramp structures 134 contacts the back of the inside edge of the slot 14, holding the door, hood, or trunk gate 12 securely closed during the painting or other manufacturing or assembly process. The extensible retention member 130 retracts and extends in a similar manner when the door, hood, or trunk gate 12 is opened. Thus, the extensible retention member 130 forms a pressure latch for holding the door, hood, or trunk gate closed, unless an adequate opening force is applied (for example, 50 N or more). This inherent movement of the various components also allows a degree of flexibility in the "fit" of the door clip assembly 100 when used with different makes and models of vehicles, as well as different vehicles of the same make and model.

Again, the retraction and extension of the extensible retention member 130 is dampened by the biasing spring 140 disposed between the cylindrical lower base member 132 and the lower base member 102 within the bore structure 120. The biasing spring 140 is seated on the seating structure 142 disposed on the top surface of the lower base member 102.

Figure 7:
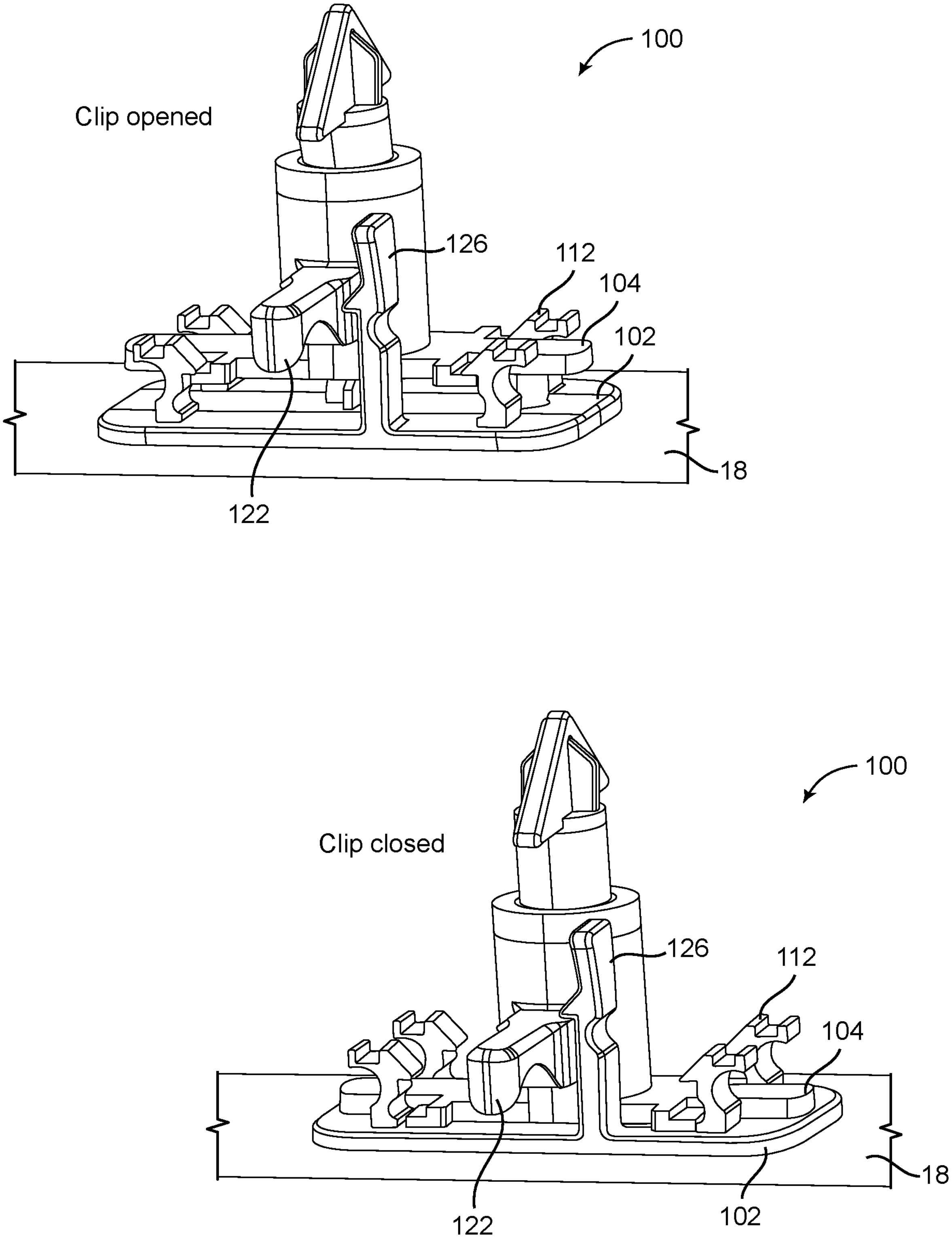
FIG. 7 is a pair of perspective views of the vehicle door clip assembly of FIGS. 4-6, illustrating the operation of the associated locking mechanism.
Figure 8:
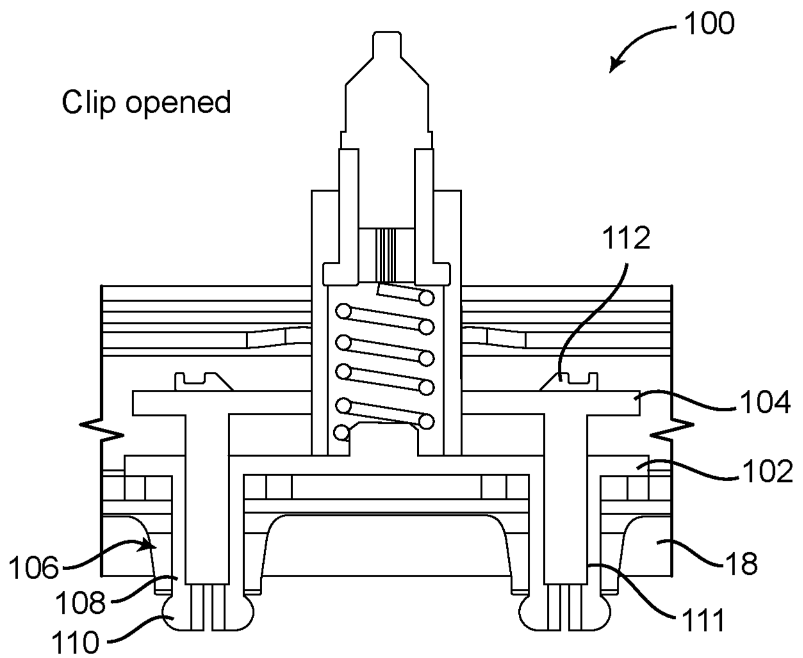
FIG. 8 is a pair of cross-sectional side views of the vehicle door clip assembly of FIGS. 4-7, again illustrating the operation of the associated locking mechanism.
Figure 8:
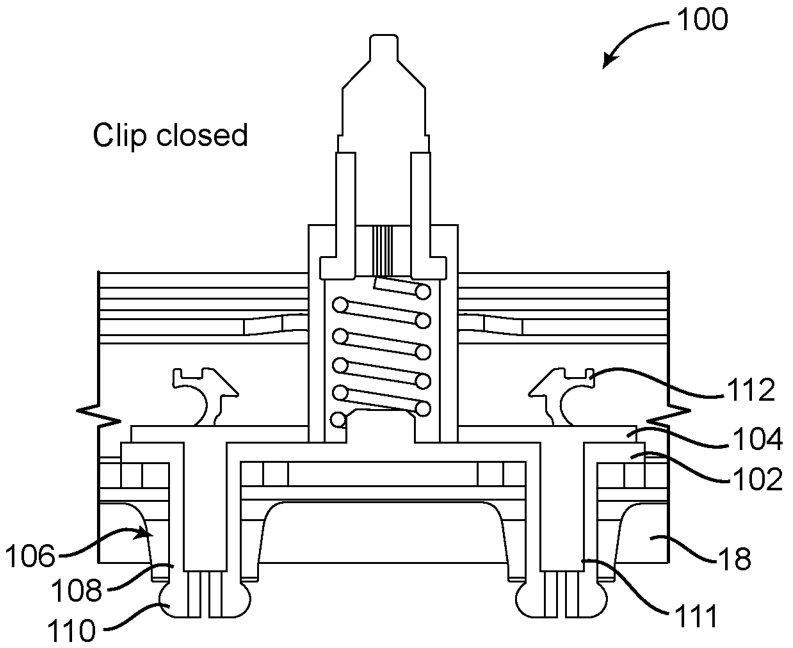

FIG. 7 is a pair of perspective views of the vehicle door clip assembly 100 of FIGS. 4-6, illustrating the operation of the associated locking mechanism. FIG. 8 is a pair of cross-sectional side views of the vehicle door clip assembly 100 of FIGS. 4-7, again illustrating the operation of the associated locking mechanism. The lower base member 102 is again selectively coupled to the door frame 18 via the pair of expandable post members 106 (FIG. 8) that protrude from the bottom of the lower base member 102 and selectively engage the existing striker member holes manufactured into the door frame 18. Each of the expandable post members 106 includes the plurality of deflectable petal structures 108 (FIG. 8) that each terminate in the widened retention portion 110 (FIG. 8). These deflectable petal structures 108 and widened retention portions 110 serve to secure the lower base member 102 in and/or release the lower base member 102 from the existing striker member holes manufactured into the door frame 18. The deflectable petal structures 108 and widened retention portions 110 define tapering internal voids and are biased apart into a securing (i.e., closed) configuration by the pair of cylindrical post structures 111 (FIG. 8) that protrude from the bottom of the upper base member 104 and into the tapering internal voids as the upper base member 104 is translated towards the lower base member 102. The deflectable petal structures 108 and widened retention portions 110 relax together into a releasing (i.e., open) configuration when the pair of cylindrical post structures 111 that protrude from the bottom of the upper base member 104 and into the tapering internal voids are withdrawn from the tapering internal voids as the upper base member 104 is translated away from the lower base member 102. Again, the upper base member 104 is allowed to translate towards and away from the lower base member 102 within the confines of the plurality of upright members 112 coupled to the top of the lower base member 102. The elongate release lever 126 (FIG. 7) extends from the lower base member 102 adjacent to the upper base member 104 (which is preferably a bit smaller than the lower base member 102). The elongate release lever 126 is deflected slightly to the side to release the stop member 122 (FIG. 7), again to translate the upper base member 104 with respect to or remove it from the lower base member 102 and upright members 112.

Figure 9:
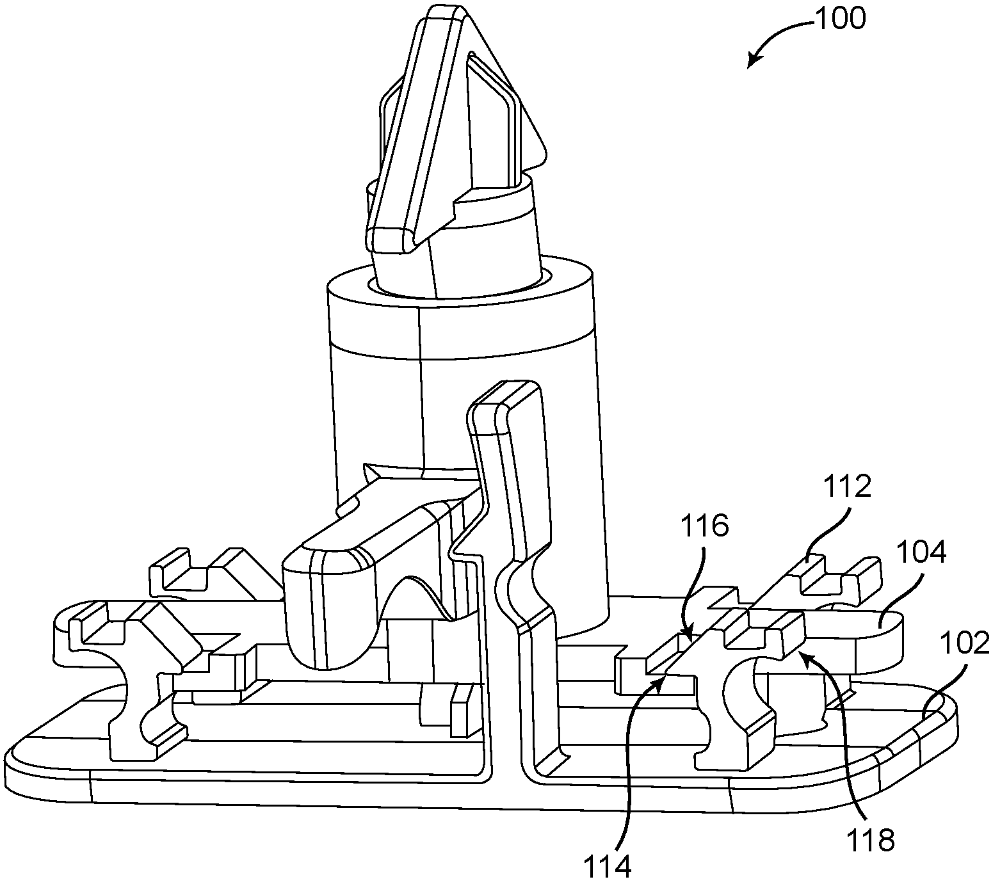
FIG. 9 is a perspective view of the vehicle door clip assembly of FIGS. 4-8, illustrating the associated removal process after a painting or other manufacturing or assembly process.

FIG. 9 is a perspective view of the vehicle door clip assembly 100 of FIGS. 4-8, illustrating the associated removal process after a painting or other manufacturing or assembly process. The upper base member 104 is allowed to translate towards and away from the lower base member 102 within the confines of a plurality of upright members 112 coupled to the top of the lower base member 102. Each of the upright members 112 sits within the step or slot 114 manufactured into a side of the upper base member 104, thereby holding the upper base member 104 and the lower base member 102 in rigid lateral, transverse, and rotational alignment, including during translation. The top portion of each of the upright members 112 includes the hook structure 116 that limits the relative translation of the upper base member 104 and the lower base member 102. Each of the upright members 112, however, is compliant enough that the it may be manually deflected using an associated tab structure 118 to such a degree that the upper base member 104 can be completely removed from the lower base member 102, if the upright members 112 are manually deflected in pairs or all together, for example.

Figure 10:
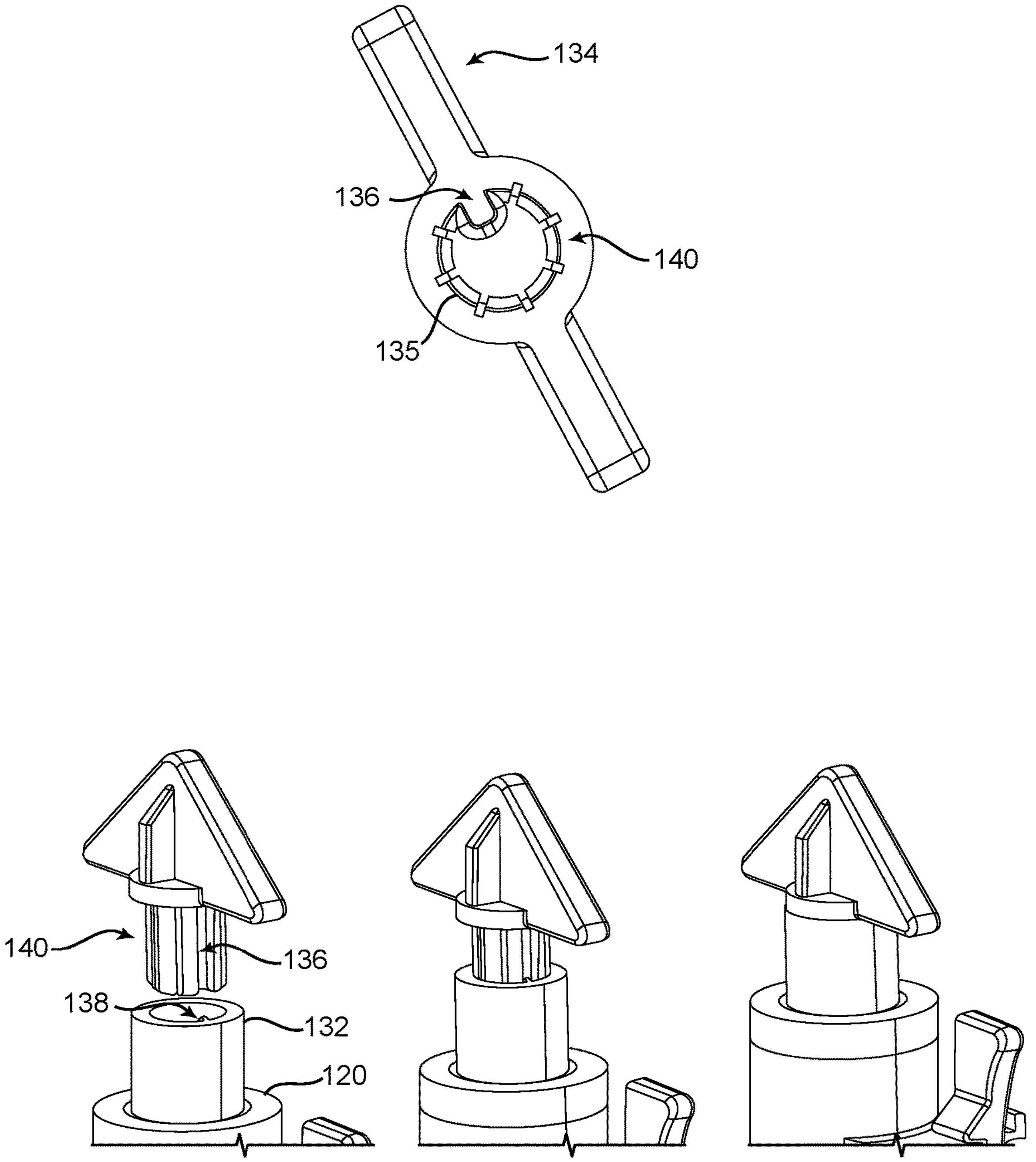
FIG. 10 is a planar end view and a series of perspective views of one exemplary embodiment of the removable door stopper cap of the vehicle door clip assembly of FIGS. 4-9.

FIG. 10 is a planar end view and a series of perspective views of one exemplary embodiment of the removable (i.e., disposable), plastic or rubber door stopper cap of the vehicle door clip assembly of FIGS. 4-9. The upper ramp structures 134 are removably coupled to the cylindrical lower base member 132 through the top of the bore structure 120 via the keyed attachment portion 135. The keyed attachment portion 135 includes a recess 136 that is adapted to engage a corresponding ridge 138 manufactured into the inside surface of the cylindrical lower base member 132, which acts as a keyed receptacle for the keyed attachment. The keyed attachment portion 135 also includes a series of rib structures 140 disposed around its circumference for holding the keyed attachment portion 135 snugly in the cylindrical lower base member 132 via a "press fit." The door stopper cap is removed from the cylindrical lower base member 132 by simply grasping it and pulling.

Although the present invention is illustrated and described herein with reference to preferred embodiments and specific examples thereof, it will be readily apparent to those of ordinary skill in the art that other embodiments and examples can perform similar functions and/or achieve like results. All such equivalent embodiments and examples are within the spirit and scope of the present invention, are contemplated thereby, and are intended to be covered by the following non-limiting claims for all purposes.

What is claimed is:

1. A vehicle door clip assembly operable for holding a door, hood, or trunk gate of a vehicle closed, the door clip assembly comprising:

a reusable body portion manufactured from a first material, the body portion comprising a cylindrical bore structure and a cylindrical lower base member adapted to translate concentrically within the cylindrical bore structure, the body portion adapted to be removably coupled to a body structure of the vehicle; and a disposable tip portion manufactured from a second material, the tip portion comprising a ramp structure and an attachment portion adapted to be received within the cylindrical lower base member of the body portion, the tip portion thereby adapted to be removably coupled to the body portion with the ramp structure adapted to contact the door, hood, or trunk gate of the vehicle.

2. The door clip assembly of claim 1, wherein the first material is one or more of a metal material and a plastic material that is capable of withstanding a vehicle coating stripping process without damage.

3. The door clip assembly of claim 1, wherein the second material is one or more of a plastic material and a rubber material that is capable of contacting a vehicle coating without marking or damaging the vehicle coating.

4. The door clip assembly of claim 1, wherein the attachment portion of the tip portion comprises a keyed attachment portion that is adapted to be removably coupled to a keyed receptacle portion of the cylindrical lower base member disposed within the cylindrical bore structure of the body portion.

5. The door clip assembly of claim 1, wherein the cylindrical lower base member of the body portion is coupled to a remainder of the body portion via an intervening biasing spring member that allows the tip portion to translate with respect to the cylindrical bore structure of the body portion.

6. The door clip assembly of claim 5, wherein the tip portion is adapted to be compressed towards the cylindrical bore structure of the body portion through the intervening biasing spring member when the tip portion is contacted by the door, hood, or trunk gate of the vehicle.

7. The door clip assembly of claim 1, wherein the body portion comprises one or more expandable post structures adapted to be removably inserted into one or more holes disposed in the body structure of the vehicle to removably couple the body portion to the body structure of the vehicle.

8. The door clip assembly of claim 7, wherein the body portion comprises a lower base member, and wherein the one or more expandable post members protrude from a bottom of the lower base member.

9. The door clip assembly of claim 8, wherein the body portion further comprises an upper base member positioned adjacent to the lower base member, wherein one or more post members protrude from a bottom of the upper base member, through the lower base member, and into the one or more expandable post structures, and wherein the one or more expandable post structures are expanded/contracted via insertion/withdrawal of the one or more post members into/from the one or more expandable post structures with translation of the upper base member towards/away from the lower base member.

10. The door clip assembly of claim 9, wherein the body portion further comprises one or more retention members protruding from a top of the lower base member and adapted to limit translation of the upper base member with respect to the lower base member.

11. A method for painting a vehicle, comprising:

attaching a vehicle door clip assembly to a body structure of the vehicle, the door clip assembly comprising:

a reusable body portion manufactured from a first material, the reusable body portion comprising a cylindrical bore structure and a cylindrical lower base member adapted to translate concentrically within the cylindrical bore structure; and a disposable tip portion manufactured from a second material, the disposable tip portion comprising a ramp structure and an attachment portion received within the cylindrical lower base member of the body portion;

closing a door, hood, or trunk gate of the vehicle to contact the ramp structure of the disposable tip portion and engage the reusable body portion of the door clip assembly attached to the body structure of the vehicle;

delivering a coating to a surface of the vehicle including a surface of the door, hood, or trunk gate of the vehicle and the door clip assembly;

opening the door, hood, or trunk gate of the vehicle and removing the door clip assembly from the body structure of the vehicle; and removing the disposable tip portion from the door clip assembly and coupling a new disposable tip portion to the reusable body portion.

12. The method of claim 11, wherein the first material is one or more of a metal material and a plastic material that is capable of withstanding a coating stripping process without damage.

13. The method of claim 11, wherein the second material is one or more of a plastic material and a rubber material that is capable of contacting the coating without marking or damaging the coating.

14. The method of claim 11, further comprising stripping the coating from the reusable body portion after the disposable tip portion has been removed and prior to coupling the new disposable tip portion to the reusable body portion.

15. The method of claim 11, further comprising disposing of the disposable tip portion after the disposable tip portion has been removed from the door clip assembly.

16. The method of claim 11, wherein attaching the door clip assembly to the body structure of the vehicle comprises inserting one or more expandable post structures protruding from a bottom of a base member of the reusable body portion of the door clip assembly into one or more holes disposed in the body structure of the vehicle.

17. The door clip assembly of claim 1, wherein the tip portion comprises a pair of opposed ramp structures.

18. The door clip assembly of claim 17, wherein the pair of opposed ramp structures are arranged such that the door, hood, or trunk gate of the vehicle first contacts one of the pair of opposed ramp structures and second contacts another of the pair of opposed ramp structures.

19. The method of claim 11, wherein the tip portion comprises a pair of opposed ramp structures.

20. The method of claim 19, wherein the pair of opposed ramp structures are arranged such that the door, hood, or trunk gate of the vehicle first contacts one of the pair of opposed ramp structures and second contacts another of the pair of opposed ramp structures.

* * * * *